US012748811B2

(12) United States Patent
Prajapati et al.

(10) Patent No.: US 12,748,811 B2
(45) Date of Patent: Sep. 29, 2026

(54) MACHINE LEARNING DRIVEN ADAPTIVE TESTING

(71) Applicant: FUSEMACHINES, INC., New York, NY (US)

(72) Inventors: Shashanka Prajapati, Dearborn, MI (US); Kiran Maiya Prajapati, Kathmandu (NP); Utsav Ratna Tuladhar, Rochester, NY (US); Kaushal Raj Mishra, Berkshire (GB); Rakesh Kumar Katuwal, Kathmandu (NP); Sameer Maskey, New York, NY (US)

(73) Assignee: Fusemachines, Inc., New York, NY (US)

( * ) Notice: Subject to any disclaimer, the term of this patent is extended or adjusted under 35 U.S.C. 154(b) by 0 days.

(21) Appl. No.: 18/732,212

(22) Filed: Jun. 3, 2024

(65) Prior Publication Data

US 2025/0139173 A1 May 1, 2025

Related U.S. Application Data

(60) Provisional application No. 63/470,329, filed on Jun. 1, 2023.

(51) Int. Cl.
*G09B 7/00* (2006.01)
*G06F 16/951* (2019.01)
*G06N 5/02* (2023.01)

(52) U.S. Cl.
CPC ............. *G06F 16/951* (2019.01); *G06N 5/02* (2013.01); *G09B 7/00* (2013.01)

(58) Field of Classification Search
CPC ........ G09B 5/00; G09B 5/06; G09B 5/08–12; G09B 7/00; G09B 7/02; G09B 7/06;
(Continued)

(56) References Cited

U.S. PATENT DOCUMENTS 11,645,935 B1 5/2023 Smetters
2006/0216683 A1 * 9/2006 Goradia .................. G09B 7/02 434/362

(Continued)

FOREIGN PATENT DOCUMENTS

CN 115662216 A 1/2023
EP 4235546 A1 8/2023
KR 20210158466 A 12/2021

OTHER PUBLICATIONS

U.S. Appl. No. 18/732,238, Non-Final Office Action dated Nov. 19, 2025.

(Continued)

*Primary Examiner* — Kang Hu
*Assistant Examiner* — Correll T French
(74) *Attorney, Agent, or Firm* — Polsinelli LLP

(57) ABSTRACT

The present disclosure provides a system for predicting the difficulty of an exam question in which a training module uses training data to create a machine learning model to predict the difficulty of a question, and the difficulty module collects inputted questions and answers from a teacher that are inputted through an education network into the machine learning model, and the difficulty of the question is displayed.

8 Claims, 8 Drawing Sheets

(58) Field of Classification Search
CPC .. G09B 7/07–10; G06Q 50/20; G06Q 50/205; G06N 20/00
See application file for complete search history.

(56) References Cited

U.S. PATENT DOCUMENTS

| | | | | |
|---|---|---|---|---|
| 2010/0273138 | A1* | 10/2010 | Edmonds | G09B 3/00 434/322 |
| 2013/0096892 | A1 | 4/2013 | Essa | |
| 2013/0224699 | A1 | 8/2013 | Jastrzembski | |
| 2015/0100303 | A1 | 4/2015 | Danson | |
| 2016/0140859 | A1* | 5/2016 | Jiao | G16H 50/30 434/362 |
| 2016/0189046 | A1* | 6/2016 | Byron | G06N 7/00 706/11 |
| 2017/0069327 | A1 | 3/2017 | Heigold et al. | |
| 2018/0218627 | A1* | 8/2018 | Smith Lewis | G09B 5/125 |
| 2019/0080627 | A1* | 3/2019 | Dey | G06F 40/247 |
| 2020/0051451 | A1* | 2/2020 | Goyal | G06F 18/22 |
| 2020/0160231 | A1* | 5/2020 | Asthana | G06F 16/9024 |
| 2021/0049923 | A1 | 2/2021 | Brinton et al. | |
| 2021/0304339 | A1 | 9/2021 | Neelakanta | |
| 2021/0358317 | A1* | 11/2021 | Faldu | G06F 18/2185 |
| 2021/0390872 | A1 | 12/2021 | Lynch | |
| 2021/0398439 | A1 | 12/2021 | Li | |
| 2022/0114900 | A1 | 4/2022 | Qiu et al. | |
| 2022/0392226 | A1 | 12/2022 | Li et al. | |
| 2022/0392368 | A1* | 12/2022 | Hall | G09B 7/00 |
| 2023/0274377 | A1 | 8/2023 | Kulshrestha et al. | |
| 2023/0289909 | A1 | 9/2023 | Chang | |
| 2023/0320642 | A1 | 10/2023 | Lin | |
| 2024/0386319 | A1 | 11/2024 | Yamamoto | |
| 2024/0394817 | A1 | 11/2024 | Issac | |
| 2025/0037493 | A1 | 1/2025 | Singh Thapa et al. | |
| 2025/0078513 | A1 | 3/2025 | Khadka et al. | |
| 2025/0173804 | A1 | 5/2025 | Gautam et al. | |

OTHER PUBLICATIONS

U.S. Appl. No. 18/599,110, Non-Final Office Action dated Mar. 9, 2026.
Aydin, "Classification of Documents Extracted from Images with Optical Character Recognition Methods," Anatolian Journal of Computer Sciences, vol. 6, No. 2, Jun. 1, 2021, pp. 46-55.
U.S. Appl. No. 18/732,238, Final Office Action dated Jul. 16, 2026.

* cited by examiner

MACHINE LEARNING DRIVEN ADAPTIVE TESTING

CROSS-REFERENCE TO RELATED APPLICATIONS

The present patent application claims the priority benefit of U.S. provisional patent application 63/470,329 filed Jun. 1, 2023, the disclosure of which is incorporated herein by reference.

BACKGROUND OF THE DISCLOSURE

1. Field of the Disclosure

The present disclosure is generally related to systems and methods that apply artificial intelligence (AI) to build customized quizzes.

2. Description of the Related Art

Currently, teachers may be unaware of how difficult a test, quiz, or exam may be for students. Also, when generating the questions for an exam, the teacher may base the question on the materials presented to the class but may not indicate how the question is structured or worded if that will make the question difficult to understand from a student's perspective. Lastly, the only feedback that a teacher has on the difficulty of a question or questions is reviewing the exams completed by the students to see if the majority of students got the question correct or incorrect. Thus, there is a need in the art to provide the difficulty of a question to the teacher.

DETAILED DESCRIPTION

Embodiments of the present disclosure will be described more fully hereinafter with reference to the accompanying drawings in which like numerals represent like elements throughout the several figures and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
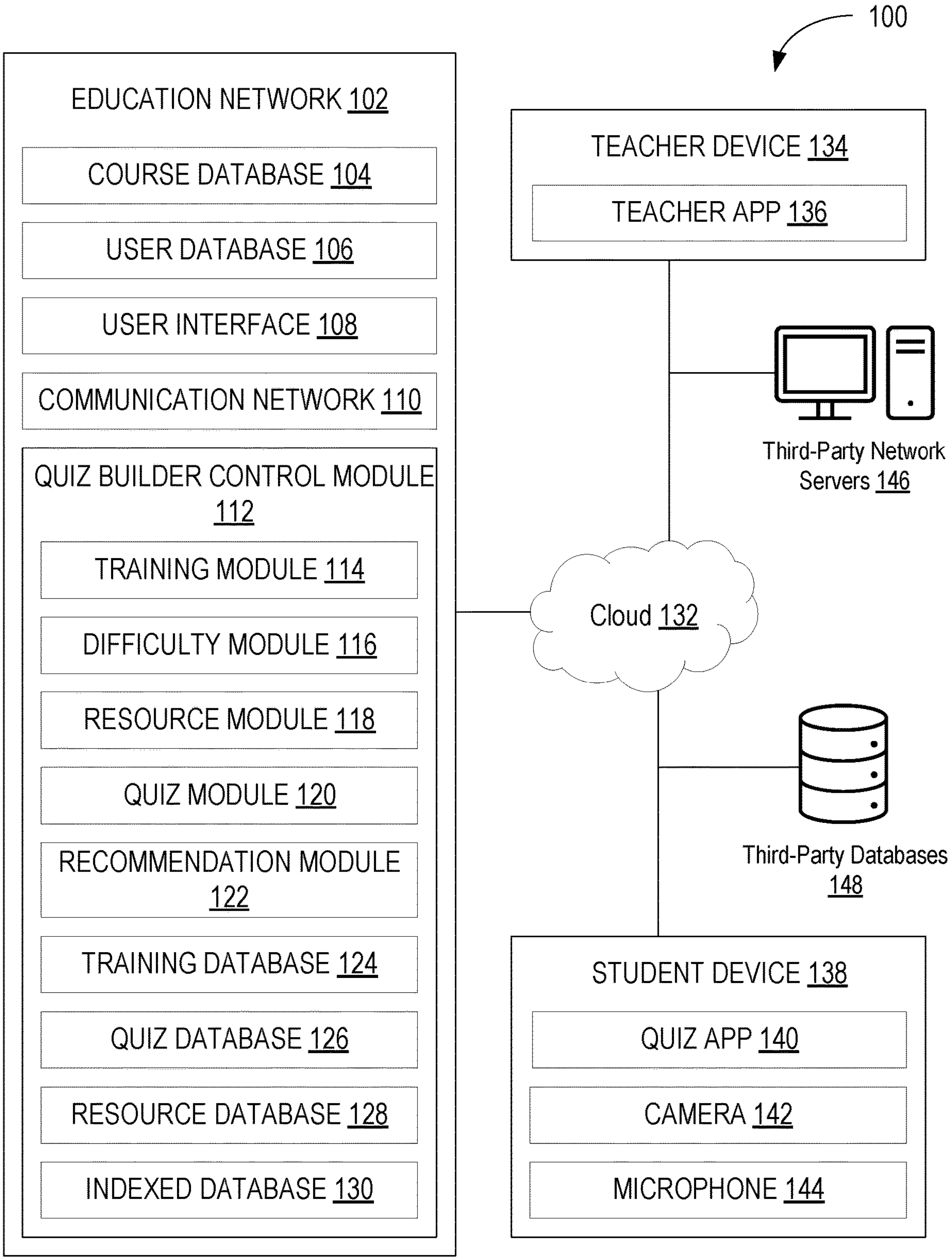
FIG. 1 illustrates an AI quiz builder.

FIG. 1 illustrates a system providing an AI quiz builder. This system comprises an education network 102, allowing users to take one or more courses online. The education network 102 provides teachers, professors, instructors, etc., the ability to generate a question for a test, quiz, exam, etc., and view the degree of difficulty of the question from the student's perspective. Further, embodiments may include a course database 104 that may store data related to courses available on the education network 102. Course information may include but is not limited to course titles, topics, syllabuses, resource materials, exams, quizzes, and instructors. Further, embodiments may include a user database 106 that may store data related to users of the education network 102.

Users may include students, instructors, proctors, or administrators. User information may include contact information, device information, enrolled courses, attendance, grades, etc. Further, embodiments may include a user interface(s) 108, which may either accept or provide outputs to the users or perform both actions. In one case, a user can interact with the user interface(s) 108 using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, or a combination of the above. Further, the user interface(s) 108 may either be implemented as a Command Line Interface (CLI), a Graphical User Interface (GUI), a voice interface, or a web-based user interface.

The education network 102 may include a communication network 110, which may be a wired and/or a wireless network. The communication network 110, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art.

The communication network 110 may allow ubiquitous access to shared pools of configurable system resources and higher-level services that can be rapidly provisioned with minimal management effort, often over the Internet, and relies on sharing of resources to achieve coherence and economies of scale, like a public utility, while third-party clouds enable organizations to focus on their core businesses instead of expending resources on computer infrastructure and maintenance. The communication network 110 may communicate with a cloud 132 that may further communicate with third-party servers 146 and third-party databases 148.

The education network 102 may include a quiz builder control module 112, which begins by initiating a training module 114. The teacher may first log in to the education network 102. And inputs a first question and a respective answer or answers to the question. The quiz builder control module 112 may store the question and answer(s) in the course database 104. The quiz builder control module 112 may initiate the difficulty module 116 and may receive the question difficulty from the difficulty module 116. The quiz builder control module 112 may display the received difficulty from the difficulty module 116 on the user interface 108. The quiz builder control module 112 may determine if the teacher edited the inputted question or answer(s). If it is determined that the teacher edited the inputted question or answer(s), the teacher edits the question or answer(s), and the process returns to initiating the difficulty module 116. If it is determined that the teacher did not edit the inputted question or answer(s), the quiz builder control module 112 may store the question and answer(s) in the quiz database 126.

The quiz builder control module 112 determines if the teacher has more questions to input. If it is determined that the teacher has more questions to input, the teacher inputs the additional question. The teacher inputs the additional answer or answers, and the process returns to initiating the difficulty module 116. If it is determined that the teacher does not have more questions, the quiz builder control module 112 initiates the resource module 118 and the quiz module 120, and the process returns to initiating the training module 114.

The education network 102 may include a training module 114, which begins by being initiated by the quiz builder control module 112. The training module 114 may extract data from the training database 124. The training module 114 may extract features from the training data. The training module 114 may generate a difficulty machine-learning model that has been trained to correlate a difficulty level to specific question features. The training module 114 returns to the quiz builder control module 112.

The education network 102 may include a difficulty module 116, which begins by being initiated by the quiz builder control module 112. The difficulty module 116 extracts the question and answer(s) from the course database 104. The difficulty module 116 extracts the features from the question. The difficulty module 116 performs the difficulty model to determine the difficulty level of the question. The difficulty module 116 sends the difficulty to the quiz builder control module 112. The difficulty module 116 returns to the quiz builder control module 112.

The education network 102 may include a resource module 118, which begins by being initiated by the quiz builder control module 112. The resource module 118 may extract the data stored in the resource database 128. The resource module 118 may perform chunking on the data extracted from the resource database 128. The resource module 118 may input the data into the analyzer. The resource module 118 may perform indexing on the data. The resource module 118 may store the indexed data in the indexed database 130.

The education network 102 may include a quiz module 120, which may begin by being initiated by the quiz builder control module 112. The student may select a quiz. The quiz module 120 may extract the quiz data from the quiz database 126. The quiz module 120 may display the first question to the student. The quiz module 120 may continuously poll for the student's answers. The quiz module 120 may determine if the student's answer is correct. If it is determined that the student's answer to the question is incorrect, the quiz module 120 may send the question to the recommendation module 122. The quiz module 120 may initiate the recommendation module 122. If it is determined that the student's answer is correct or after the student has received the recommendation from the recommendation module 122, the quiz module 120 may determine if more questions remain in the quiz data. If it is determined that more questions remain in the quiz data, the quiz module 120 may display the next question to the student, and the process returns to continuously polling for the student's answer. If it is determined that no more questions are remaining in the quiz data, the quiz module 120 returns to the quiz builder control module 112.

The education network 102 may include a recommendation module 122, which begins by being initiated by the quiz module 120. The recommendation module 122 may receive the question from the quiz module 120. The recommendation module 122 may perform natural language processing (NLP) which may include part-of-speech (POS) tagging, which is giving each word in a text a grammatical category, on the received question. The recommendation module 122 inputs the data into the analyzer. The recommendation module 122 may query the indexed database 130. The recommendation module 122 may receive the resources from the indexed database 130. The recommendation module 122 may apply a language model, such as Bidirectional Encoder Representations from Transformers (BERT), on the received resources from the indexed database 130 to parse out the meaning of ambiguous language in text by using surrounding text to establish context. The recommendation module 122 may display the resource containing the answer to the received question. The recommendation module 122 returns to the quiz module 120.

The education network 102 may include a training database 124 containing the training data to generate the difficulty model. The database may contain historical data collected by the education network 102, for example, the historical quiz data, such as a timestamp, quiz ID, student ID, if the student passed or failed the quiz, etc. The historical data may have difficulty labels associated with the questions, such as easy, medium, or hard. The difficulty labels may be generated for the training data stored in the training database 124. For example, for tests, quizzes, exams, etc., that a student can take multiple times, all attempts after the first correct attempt are ignored. In some cases, the training data may be used to calibrate the difficulty to the respective students.

For example, if a student gets a question correct on the third attempt, all attempts after the third attempt are discarded. If the student gets a question correct on the first or second attempt, the label generated for the question is easy for that student. If the student gets a question correct on the third or fourth attempt, the label generated for the question is medium for that student, and if it takes five or more attempts, then the label generated is hard for that student. Then the questions have a set of labels for each student, and then the labels are aggregated, and the median label is taken for each question.

For example, if 5 students label the question as easy (0), 1 label it as medium (1), and 1 labels it as hard (2), the following data is 0, 0, 0, 0, 0, 1, 2 where 0 represents easy, 1 represents medium, and 2 represents hard. The median of the data is 0, and the label generated for the question is easy. Similarly, if 2 students label a question as easy, 2 students label it as medium, and 3 students label it as hard, the following data is 0, 0, 1, 1, 2, 2, 2 in which the median is 1 and the label generated for the question medium. For tests, quizzes, exams, etc. that a student may only take once the labels are generated by comparing the number of students that got the question correct and the number of students that got the question incorrect. The percentage of students that got the question incorrect determined the difficulty label of the question. For example, the label is hard if over 40% of the students get a question wrong. If 20-40% of the students get the question wrong, the label is medium, and the label is easy if less than 20% get the question wrong.

The education network 102 may include a quiz database 126, which contains the list of questions and answers inputted by the teacher in the quiz builder control module 112. The quiz database 126 contains the finalized list of questions for the student's test, quiz, exam, etc., that the students may take through the student devices 138. In some cases, the data stored in the quiz database 126 may be stored in the course database 104. In some cases, the quiz database 126 may be a database that is stored within the course database 104.

The education network 102 may include a resource database 128, which may contain the resource data which may contain the answers to a plurality of questions created by a teacher, professor, instructor, etc. The resource data may be materials, documents, textbooks, etc., provided to the students to prepare for an exam, quiz, test, etc. The resource data may be a plurality of online resources, such as links, websites, articles, etc. In some cases, the resource data may be materials that are provided to students and materials that are not provided to students but may be relevant based upon the subject matter taught or discussed during the course.

The education network 102 may include an indexed database 130, which contains the indexed data created by the analyzer in the resource module 118. For example, the indexed data is stored in the analyzer cluster. A distributed architecture may be used, so the data may be split across multiple nodes in the cluster for scalability and redundancy.

The education network 102 may include a cloud 132, which is a distributed network of computers comprising servers and databases. A cloud 132 may be a private cloud 132, where access is restricted by isolating the network, such as preventing external access, or by using encryption to limit access to only authorized users. Alternatively, a cloud 132 may be a public cloud 132 where access is widely available via the internet. A public cloud 132 may not be secured or may include limited security features.

The education network 102 may include a teacher device 134 that may be a computing device such as a personal computer, laptop, smartphone, tablet, or smart speaker. The education network 102 may include a teacher app 136 that may reside on the teacher device 134 and allow the teacher to access the education network 102 and generate the test, quiz, exam, etc. through the user interface 108 on the education network 102. The education network 102 may include a student device 138 that may be a computing device such as a personal computer, laptop, smartphone, tablet, or smart speaker.

The education network 102 may include a quiz app 140 that may reside on the student device 138 and allow students to access the education network 102 and take exams, tests, quizzes, etc., generated by the teacher, professor, instructor, etc. through the education network 102. The education network 102 may include a camera 142 integrated with or communicatively coupled with the student device 138. The camera 142 captures video at 30 frames per second in some cases. The education network 102 may include a microphone 144 integrated with or communicatively coupled with the student device 138.

Figure 2:
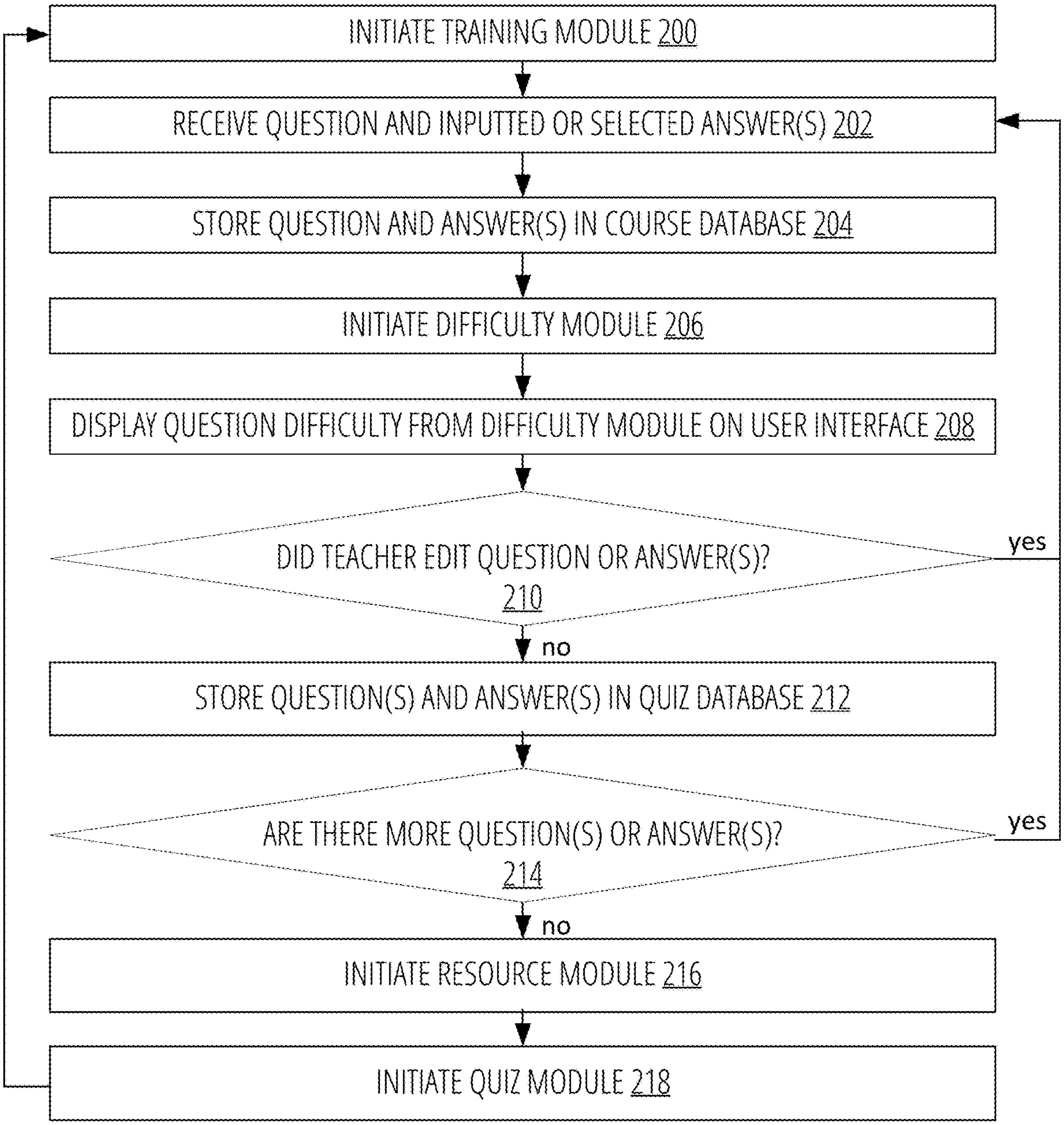
FIG. 2 illustrates a quiz builder control module.

FIG. 2 illustrates the quiz builder control module 112. The process begins with the quiz builder control module 112 initiating, at step 200, the training module 114. For example, the training module 114 begins by being initiated by the quiz builder control module 112. The training module 114 extracts the data from the training database 124. The training module 114 extracts the features from the training data. The training module 114 generates the difficulty model. The training module 114 returns to the quiz builder control module 112. The teacher logs, at step 202, into the education network 102. For example, the teacher may have credentials to log into the education network 102, such as a username and password.

In some cases, the teacher may have additional features on the education network 102 that are not available to students, such as generating quizzes or exams, reviewing students' work, grading assignments, reviewing if students have completed certain tasks, etc. The teacher inputs, at step 204, the first question. For example, the teacher may create a quiz, test, exam, etc., through the education network 102 and select create a new quiz and then select add a new question. The teacher's input may be inputted through a text box on the education network 102. The teacher may input the answer or answers to the question or the answer(s) may be automatically generated based on a machine-learning model. For example, the teacher may input or selection options provided by the machine-learning model, such as a single correct answer, or multiple correct answers, decide if the answer is a write-in answer for the student, such as providing the student with a text box to input their answers, or if the answers are multiple-choice, such as two, three, four, etc. choices with only one correct answer or multiple correct answers.

The quiz builder control module 112 may store, at step 204, the question and answer(s) in the course database 104. For example, the quiz builder control module 112 may store the teacher's question and answer(s) in the course database 104. In some cases, the question and answer(s) may be stored in memory on the education network 102 until the teacher confirms the question and answer(s), stored in the quiz database 126. The quiz builder control module 112 may initiate, at step 206, the difficulty module 116. For example, the difficulty module 116 may begin by being initiated by the quiz builder control module 112.

The difficulty module 116 may extract the question and answer(s) from the course database 104. The difficulty module 116 may extract features from the question. The difficulty module 116 may perform the difficulty model to determine the difficulty level of the question. The difficulty module 116 may send the difficulty to the quiz builder control module 112. The difficulty module 116 may return to the quiz builder control module 112. The quiz builder control module 112 may receive the question difficulty from the difficulty module 116. For example, the quiz builder control module 112 may receive the difficulty of the question, such as easy, medium, or hard, from the student's perspective. The quiz builder control module 112 may display, at step 208, the received difficulty from the difficulty module 116 on the user interface 108. For example, the quiz builder control module 112 may display the difficulty of the question on the user interface 108 to inform the teacher of the difficulty of the question from the student's perspective.

The quiz builder control module 112 may determine, at step 210, if the teacher edited the inputted question or answer(s). For example, the quiz builder control module 112 may determine if the teacher edited the question or answer if the teacher selects the text box for the question or the answer(s) of the question. In some cases, the teacher may have to select an edit option on the user interface 108 to adjust or change the question or answer(s). If it is determined that the teacher edited the inputted question or answer(s) the teacher edits, at step 218, the question or answer(s), and the process returns to storing the question and answer(s) in the course database 104. If it is determined that the teacher did not edit the inputted question or answer(s), the quiz builder control module 112 may store, at step 212, the question and answer(s) in the quiz database 126. For example, the quiz builder control module 112 may store the question and answer(s) in the quiz database 126 contains the list of questions and answers inputted by the teacher in the quiz builder control module 112.

The quiz database 126 contains the finalized list of questions for the student's test, quiz, exam, etc., that the students may take through the student devices 138. In some cases, the data stored in the quiz database 126 may be stored in the course database 104. In some cases, the quiz database 126 may be a database that is stored within the course database 104. The quiz builder control module 112 determines, at step 214, if the teacher has more questions to input. For example, the teacher may select to add an additional question by selecting an option on the user interface 108. If it is determined that the teacher has more questions to input, the teacher inputs, at step 202, the additional question. For example, the teacher's input may be inputted through a text box on the education network 102.

The teacher inputs the additional answer or answers, and the process returns to store the question and answer(s) in the course database 104. For example, the teacher may input a single correct answer, or multiple correct answers, decide if the answer is a write-in answer for the student, such as providing the student with a text box to input their answers, or if the answers are multiple-choice, such as two, three, four, etc. choices with only one correct answer or multiple correct answers. If it is determined that the teacher does not have more questions, the quiz builder control module 112 initiates, at step 216, the resource module 118. For example, the resource module 118 begins by being initiated by the quiz builder control module 112. The resource module 118 extracts the data stored in the resource database 128.

The resource module 118 may perform chunking on the data extracted from the resource database 128. The resource module 118 may input the data into the analyzer. The resource module 118 may perform indexing on the data. The resource module 118 may store the indexed data in the indexed database 130. The resource module 118 may return to the quiz builder control module 112.

The quiz builder control module 122 may initiate, at step 218, the quiz module 120. For example, the quiz module 120 begins by being initiated by the quiz builder control module 112. The student may select the quiz and the quiz module 120 may extract the quiz data from the quiz database 126. The quiz module 120 may display the first question to the student. The quiz module 120 may be continuously polling for the student's answers to the question. The quiz module 120 may determine if the student's answer is correct.

If it is determined that the student's answer to the question is incorrect, the quiz module 120 sends the question to the recommendation module 122. The quiz module 120 may initiate the recommendation module 122. If it is determined that the student's answer is correct or after the student has received the recommendation from the recommendation module 122, the quiz module 120 may determine if more questions remain in the quiz data. If it is determined that more questions remain in the quiz data, the quiz module 120 may display the next question to the student, and the process may return to continuously polling for the student's answer. If it is determined that no more questions remain in the quiz data, the quiz module 120 may return to the quiz builder control module 112.

Figure 3:
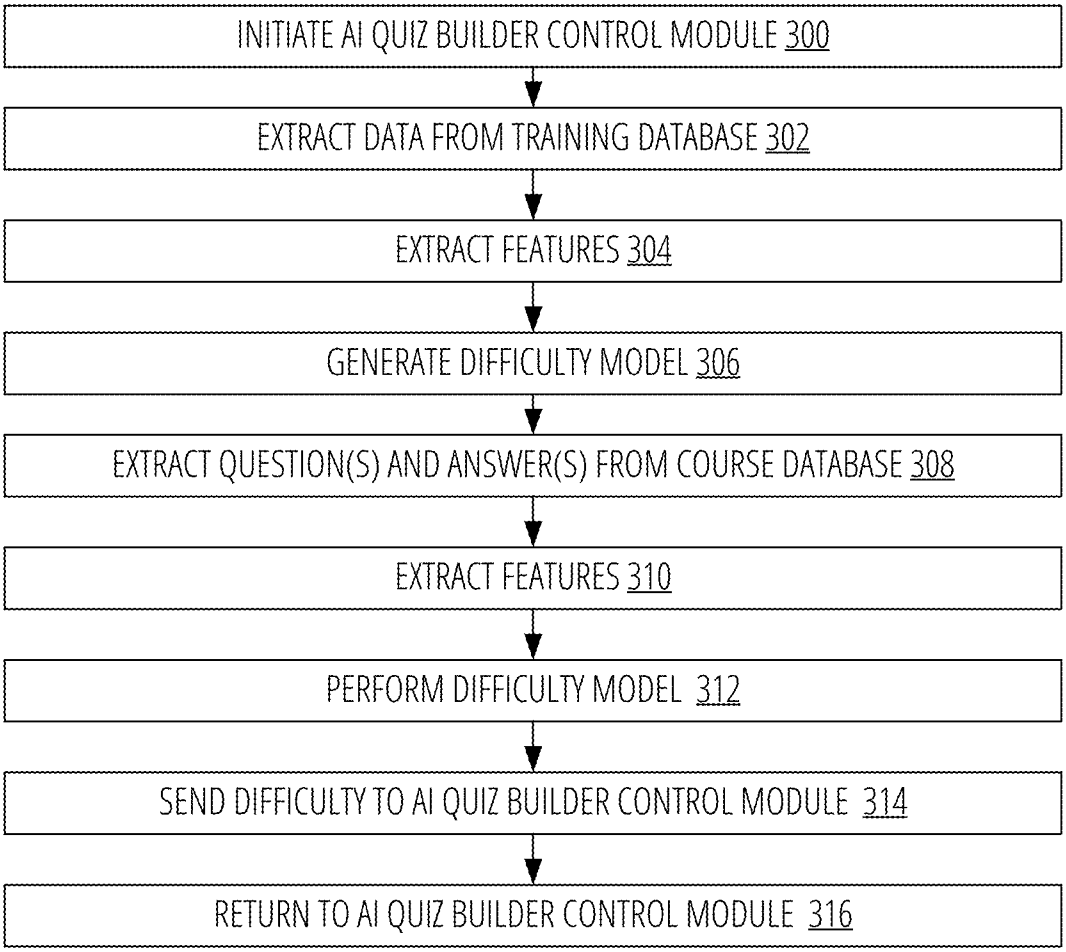
FIG. 3 illustrates a training module and difficulty module.

FIG. 3 illustrates the training module 114 and the difficulty module 116. The process begins with the training module 114 being initiated, at step 300, by the quiz builder control module 112. In some cases, the training module 114 may be continuously initiated to continuously improve the difficulty model. The training module 114 may extract, at step 302, the data from the training database 124. For example, the training module 114 extracts the training data from the training database 124. The training database 124 may be the training data to generate the difficulty model.

The database may contain historical data collected by the education network 102, for example, the historical quiz data, such as a timestamp, quiz ID, student ID, if the student passed or failed the quiz, etc. The historical data may have difficulty labels associated with the questions, such as easy, medium, or hard. The difficulty labels may be generated for the training data stored in the training database 124. For example, for tests, quizzes, exams, etc., that a student can take multiple times, all of the attempts after the first correct attempt are ignored. For example, if a student gets a question correct on the third attempt, all attempts after the third attempt are discarded. If the student gets a question correct on the first or second attempt, the label generated for the question is easy for that student. If the student gets a question correct on the third or fourth attempt, the label generated for the question is medium for that student, and if it takes five or more attempts, then the label generated is hard for that student.

Then the questions may have a set of labels for each student, the labels are aggregated, and the median label is taken for each question. For example, if 5 students label the question as easy (0), 1 label it as medium (1), and 1 label it as hard (2), the following data is 0, 0, 0, 0, 0, 1, 2 where 0 represents easy, 1 represents medium, and 2 represents hard. The median of the data is 0, and the label generated for the question is easy. Similarly, if 2 students label a question as easy, 2 students label it as medium, and 3 students label it as hard, the following data is 0, 0, 1, 1, 2, 2, 2 in which the median is 1 and the label generated for the question medium.

For tests, quizzes, exams, etc. that a student may only take once the labels are generated by comparing the number of students that got the question correct and the number of students that got the question incorrect. The percentage of students that got the question incorrect determined the difficulty label of the question. For example, the label is hard if over 40% of the students get a question wrong. If 20-40% of the students get the question wrong, the label is medium, and the label is easy if less than 20% get the question wrong. The training module 114 extracts, at step 304, the features from the training data. For example, the training module 114 extracts the features from the questions extracted from the training database 124, in which vectors are generated for answers which are then used to generate answer similarity features.

Answer similarity between two answers is computed as cosine similarity between their vectors. In some cases, the features that are extracted may be the number of options a question has, the number of correct answers among the options, including some questions that may have multiple correct answers, whether the question is a single choice or multiple choice question, the number of words in the question's text, the number of words in the correct answer or if there are multiple correct answers the average number of words in the correct answers, the number of words in the wrong answers or if there are multiple wrong answers the average number of words in the wrong answers, similarity of the correct answers, similarity of the wrong answers, calculating the similarity of each correct answer with each wrong answer and take the average of all similarities, calculating the similarity of each answer with all the other answers and take the average of all similarities, whether a student can take the quiz multiple times or not, etc.

The training module 114 may generate, at step 306, the difficulty model. For example, the training module 114 may generate a difficulty model to predict the difficulty of a future question to be used to inform a teacher of the difficulty of the question and thus determine how difficult the quiz, test, exam, etc., will be for the students. For example, the difficulty model may be a machine learning model that may examine features, measurable properties, and data set parameters. It may utilize a feature vector, or a set of multiple numeric features, as a training input for prediction purposes. An algorithm takes a set of "training data" as input. The learning algorithm finds patterns in the input data and trains the model for expected results. The output of the training process is the machine learning model. A model may then make a prediction when fed input data. The value the machine learning model has to predict is called the target or label.

For example, the difficulty model may be a logistic regression algorithm, a statistical algorithm used to make predictions about binary outcomes by analyzing data. A logistic regression algorithm is a type of regression analysis in which the outcome or response variable, or dependent variable, is categorical, and the predictors, features, or independent variables may be continuous or categorical. Logistic regression algorithms output a probability score between 0 and 1 to classify the outcome as one category or another by determining the relationship between the probability of a certain outcome occurring and the independent variables. The training data allows the algorithm to learn and create a model that predicts the probability of a certain outcome occurring based on the values of the inputted features. For example, the algorithm adjusts the model's parameters to minimize the difference between the actual outcomes in the training data and the predicted probabilities.

The algorithm uses the training data to estimate the coefficients of the independent variables used in the logistic regression equation. The coefficients are calculated to maximize the probability of the observed data, given the values of the independent variables. Predictions can be made on the new data once the coefficients have been estimated. The model can predict the probability of a certain outcome occurring, such as if a question will be easy, medium, or hard, based on the values of the input features, such as the features of the questions, by estimating the parameters of the model, for example, the coefficients of the independent variables, through the training data. In some cases, the difficulty model may be a rules-based model in which the machine learning method identifies, learns, or evolves rules that are stored, weighted, manipulated, or applied. Rules-based machine learning identifies and utilizes a set of relational rules that represent the knowledge captured by the system.

For example, the machine learning model may determine the similarity between a question inputted by the teacher and a historical question and, based on the rules stored or manipulated by the machine learning module, provide a difficulty to the question. In some cases, the difficulty model may be generated by a neural network which may be trained by processing examples that contain a known input, such as a question, and a known result, such as the difficulty of the question, forming probability-weighted associations between the input and result. The training may be supervised training in which the difference between the prediction and the target output is determined and weighted associations are adjusted until the prediction is similar to the target output. For example, the neural network may be trained on the data stored in the training database 124 to generate the difficulty model, and when a teacher inputs a new question, the difficulty model may predict the difficulty of the inputted question. In some cases, the difficulty model may be an adaptive model in which artificial intelligence algorithms are used to deliver customized resources and learning activities to address the learner's unique needs.

For example, the difficulty model may be able to predict the difficulty of the inputted question by the teacher for each student that is taking the quiz. In some cases, the difficulty model may be a knowledge graph model in which graph-structured data is used to integrate the new data, such as the teacher's inputted question. Knowledge graphs store interlinked descriptions of objects, events, situations, or abstract concepts and encode the semantics underlying the terminology used. For example, the training data stored in the training database 124 may be used to generate a knowledge graph model by breaking down the words within a question, and the model may generate a difficulty for the word. The difficulty for each word may be used to determine the average difficulty of the question to output the difficulty of the question. The training module 114 may return to the quiz builder control module 112. In some cases, if new training data is added or stored in the training database 124, the training module 114 may be initiated again by the quiz builder control module 112 to further improve the difficulty model.

The difficulty module 116 may then extract, at step 310, the question and answer(s) from the course database 104. For example, the difficulty module 116 may extract the question and answer(s) from the course database 104 that were inputted by the teachers in the quiz builder control module 112. For example, the difficulty module 116 may extract the features from the question and answer(s) extracted from the course database 104, in which vectors are generated for answers which are then used to generate answer similarity features. Answer similarity between two answers is computed as cosine similarity between their vectors.

In some cases, the features that are extracted may be the number of options a question has, the number of correct answers among the options, including some questions that may have multiple correct answers, whether the question is a single choice or multiple choice question, the number of words in the question's text, the number of words in the correct answer or if there are multiple correct answers the average number of words in the correct answers, the number of words in the wrong answers or if there are multiple wrong answers the average number of words in the wrong answers, similarity of the correct answers, similarity of the wrong answers, calculating the similarity of each correct answer with each wrong answer and take the average of all similarities, calculating the similarity of each answer with all the other answers and take the average of all similarities, whether a student can take the quiz multiple times or not, etc.

The difficulty module 116 may perform, at step 312, the difficulty model to determine the difficulty level of the question. For example, the difficulty model may be a logistic regression algorithm, a statistical algorithm used to make predictions about binary outcomes through analyzing data. A logistic regression algorithm is a type of regression analysis in which the outcome or response variable, or dependent variable, is categorical, and the predictors, features, or independent variables may be continuous or categorical. Logistic regression algorithms output a probability score between 0 and 1 to classify the outcome as one category or another by determining the relationship between the probability of a certain outcome occurring and the independent variables. The training data allows the algorithm to learn and create a model that predicts the probability of a certain outcome occurring based on the values of the inputted features. For example, the algorithm adjusts the model's parameters to minimize the difference between the actual outcomes in the training data and the predicted probabilities. The algorithm uses the training data to estimate the coefficients of the independent variables used in the logistic regression equation. The coefficients are calculated to maximize the probability of the observed data, given the values of the independent variables.

Predictions can be made on the new data once the coefficients have been estimated. The model can predict the probability of a certain outcome occurring, such as if a question will be easy, medium, or hard, based on the values of the input features, such as the features of the questions, by estimating the parameters of the model, for example, the coefficients of the independent variables, through the training data. In some cases, the difficulty model may be a rules-based model in which the machine learning method identifies, learns, or evolves rules that are stored, manipulated, or applied. Rules-based machine learning identifies and utilizes a set of relational rules that represent the knowledge captured by the system. For example, the machine learning model may determine the similarity between a question inputted by the teacher and a historical question and, based on the rules stored or manipulated by the machine learning module, provide a difficulty to the question. In some cases, the difficulty model may be generated by a neural network which may be trained by processing examples that contain a known input, such as a question, and a known result, such as the difficulty of the question, forming probability-weighted associations between the input and result.

The training may be supervised training in which the difference between the prediction and the target output is determined and weighted associations are adjusted until the prediction is similar to the target output. For example, the neural network may be trained on the data stored in the training database 124 to generate the difficulty model, and when a teacher inputs a new question, the difficulty model may predict the difficulty of the inputted question. In some cases, the difficulty model may be an adaptive model in which artificial intelligence algorithms are used to deliver customized resources and learning activities to address the learner's unique needs. For example, the difficulty model may be able to predict the difficulty of the inputted question by the teacher for each student that is taking the quiz.

In some cases, the difficulty model may be a knowledge graph model in which graph-structured data is used to integrate the new data, such as the teacher's inputted question. Knowledge graphs store interlinked descriptions of objects, events, situations, or abstract concepts and encode the semantics underlying the terminology used. For example, the training data stored in the training database 124 may be used to generate a knowledge graph model by breaking down the words within a question, and the model may generate a difficulty for the word. The difficulty for each word may be used to determine the average difficulty of the question to output the difficulty of the question. The difficulty module 116 sends, at step 314, the difficulty to the quiz builder control module 112. For example, once the outputted data, such as if the question is easy, medium, or hard, is determined by the difficulty model, the difficulty module 116 sends the difficulty, such as easy, medium, or hard, to the quiz builder control module 112. The difficulty module 116 returns, at step 316, to the quiz builder control module 112.

Figure 4:
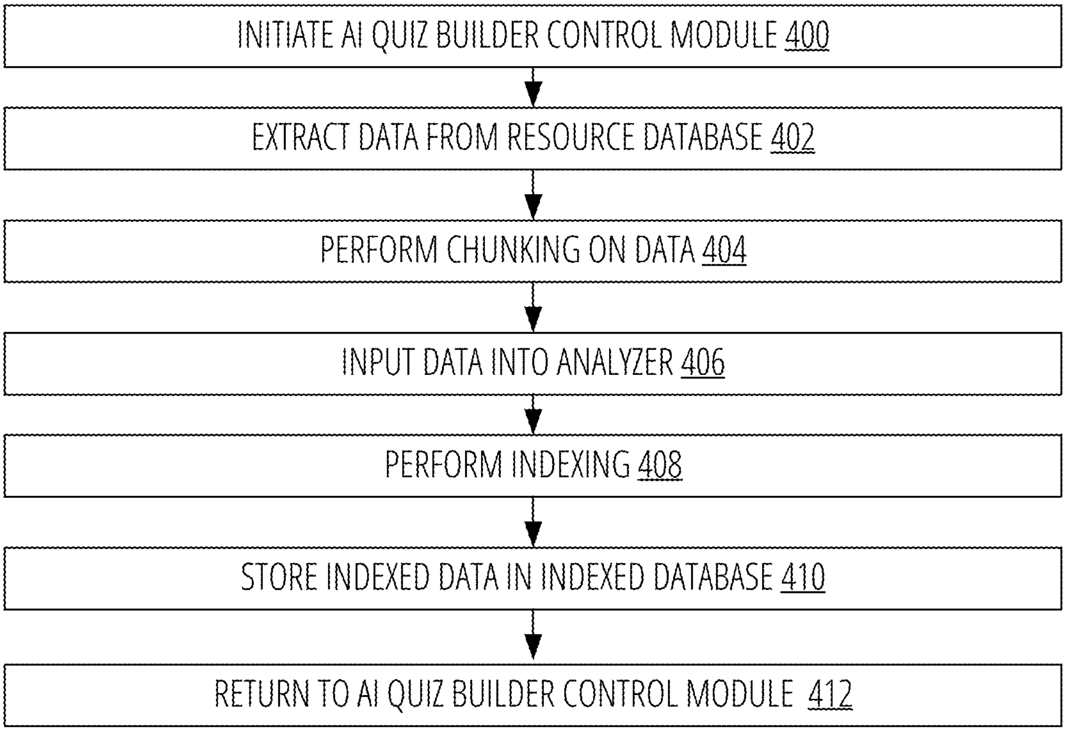
FIG. 4 illustrates a resource module.

FIG. 4 illustrates the resource module 118. The process begins with the resource module 118 being initiated, at step 400, by the quiz builder control module 112. In some cases, the resource module 118 may be initiated once data is stored or added to the resource database 128. The resource module 118 extracts, at step 402, the data stored in the resource database 128.

For example, the resource module 118 extracts the resource data, which may contain the answers to a plurality of questions created by a teacher, professor, instructor, etc. The resource data may be materials, documents, textbooks, etc., provided to the students to prepare for an exam, quiz, test, etc. The resource data may be a plurality of online resources, such as links, websites, articles, etc. In some cases, the resource data may be materials that are provided to students and materials that are not provided to students but may be relevant based upon the subject matter taught or discussed during the course.

The resource module 118 may perform, at step 404, chunking on the data extracted from the resource database 128. For example, the resource module 118 may break the individual documents into their pages where an answer for a given question may be present. For example, document chunking is a natural language processing technique that involves dividing a text or document into syntactically correlated and meaningful chunks. The documents may be broken into pages by saving the documents as text files and then converting the text files to PDF documents in which pages occur naturally and then the PDF file is parsed.

The resource module 118 inputs, at step 406, the data into the analyzer. For example, the extracted data from the resource database 128 chunked or parsed is inputted into the analyzer, which performs text analysis on documents, breaking them down into individual terms or tokens that can be indexed and searched. An analyzer consists of a tokenizer, which splits the text into individual words or tokens, and one or more token filters, which modify or remove certain tokens based on various criteria, such as lowercasing, stemming, or removing stop words. In some cases, the HTML tags may be removed if the data contains HTML tags.

The resource module 118 may perform, at step 408, indexing on the data. For example, the resource module may perform indexing on the data, which may be performed by the analyzer. For example, the text is first analyzed using the analyzer specified for the index. The analyzer breaks down the text into individual terms or tokens, applies any configured filters, and generates a list of terms to be indexed. Then the document is normalized by storing the individual terms along with metadata such as the document ID, index name, and any field names or metadata associated with the document. Then an inverted index is created, which is a data structure that maps terms to the documents in which they appear.

The inverted index allows the analyzer to quickly look up documents that contain a given term or set of terms, which is the basis for the search functionality. Then the indexed data is stored in the analyzer cluster. A distributed architecture may be used, so the data may be split across multiple nodes in the cluster for scalability and redundancy. The resource module 118 may store, at step 410, the indexed data in the indexed database 130. For example, the indexed data is stored in the analyzer cluster. A distributed architecture may be used, so the data may be split across multiple nodes in the cluster for scalability and redundancy. The resource module 118 may return, at step 412, to the quiz builder control module 112.

Figure 5:
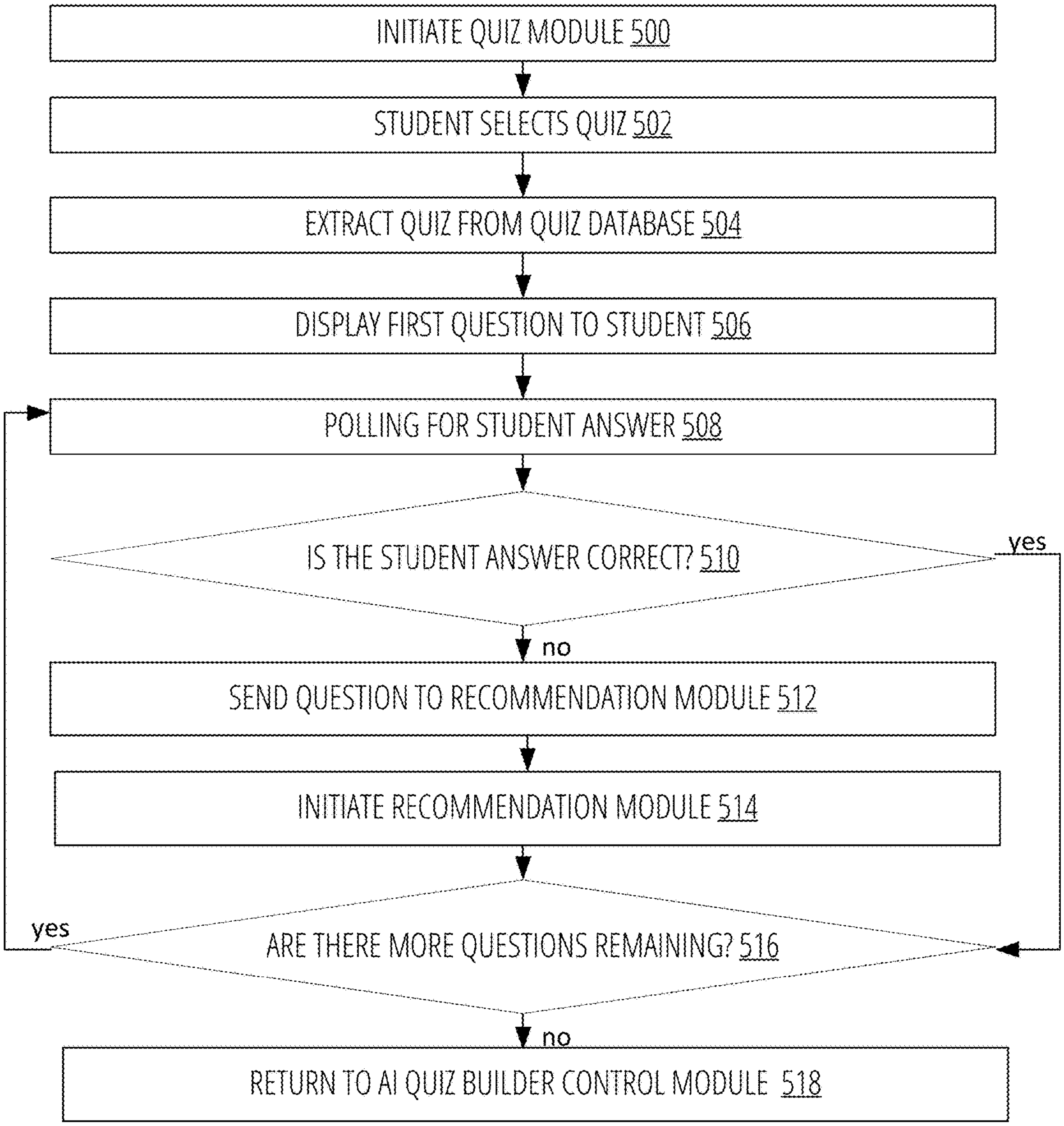
FIG. 5 illustrates a quiz module.

FIG. 5 illustrates the quiz module 120. The process begins with the quiz module 120 being initiated, at step 500, by the quiz builder control module 112. In some cases, the quiz module 120 may be initiated through the student device 138 accessing the education network 102 and selecting a quiz assigned in the course. The student selects, at step 502, the quiz. For example, the student may search the quiz database 126 for the quiz that they have been assigned to complete. In some cases, the student may only be able to view and search quizzes assigned to them in their current courses.

The quiz module 120 extracts, at step 504, the quiz data from the quiz database 126. For example, the quiz module 120 extracts the list of questions and answers inputted by the teacher in the quiz builder control module 112. The quiz database 126 contains the finalized list of questions for the student's test, quiz, exam, etc., that the students may take through the student devices 138. In some cases, the data stored in the quiz database 126 may be stored in the course database 104. In some cases, the quiz database 126 may be a database that is stored within the course database 104.

The quiz module 120 displays, at step 506, the first question to the student. For example, the quiz module 120 may display on the student device 138, in a quiz app 140, the first question on the quiz. The quiz module 120 is continuously polling, at step 508, for the student's answer to the question. For example, the student may input the answer to the question, such as inputting an answer into a text field, selecting a multiple-choice answer, etc. The quiz module 120 determines, at step 510, if the student's answer is correct. For example, the quiz module 120 may compare the student's answer to the extracted answer from the quiz database 126 to determine if the student has correctly answered the question.

If it is determined that the student's answer to the question is incorrect, the quiz module 120 sends, at step 512, the question to the recommendation module 122. For example, if the student's answer does not match the extracted answer to the question, the quiz module 120 sends the question to the recommendation module 122. The quiz module 120 may initiate, at step 514, the recommendation module 122. For example, the recommendation module 122 may begin by being initiated by the quiz module 120. The recommendation module 122 may receive the question from the quiz module 120. The recommendation module 122 may perform POS tagging on the received question. The recommendation module 122 inputs the tagged data into the analyzer. The recommendation module 122 queries the indexed database 130. The recommendation module 122 receives the resources from the indexed database 130. The recommendation module 122 performs BERT on the received resources from the indexed database 130. The recommendation module 122 may display the resource containing the answer to the received question. The recommendation module 122 may return to the quiz module 120.

If it is determined that the student's answer is correct or after the student has received the recommendation from the recommendation module 122, the quiz module 120 may determine, at step 516, if more questions remain in the quiz data. For example, the quiz module 120 continuously displays the questions extracted from the quiz database 126 until no more questions remain and the student completes the quiz. If it is determined that more questions remain in the quiz data, the quiz module 120 may display the next question to the student, and the process returns to continuously polling for the student's answer. If it is determined that no more questions are remaining in the quiz data, the quiz module 120 returns, at step 518, to the quiz builder control module 112.

Figure 6:
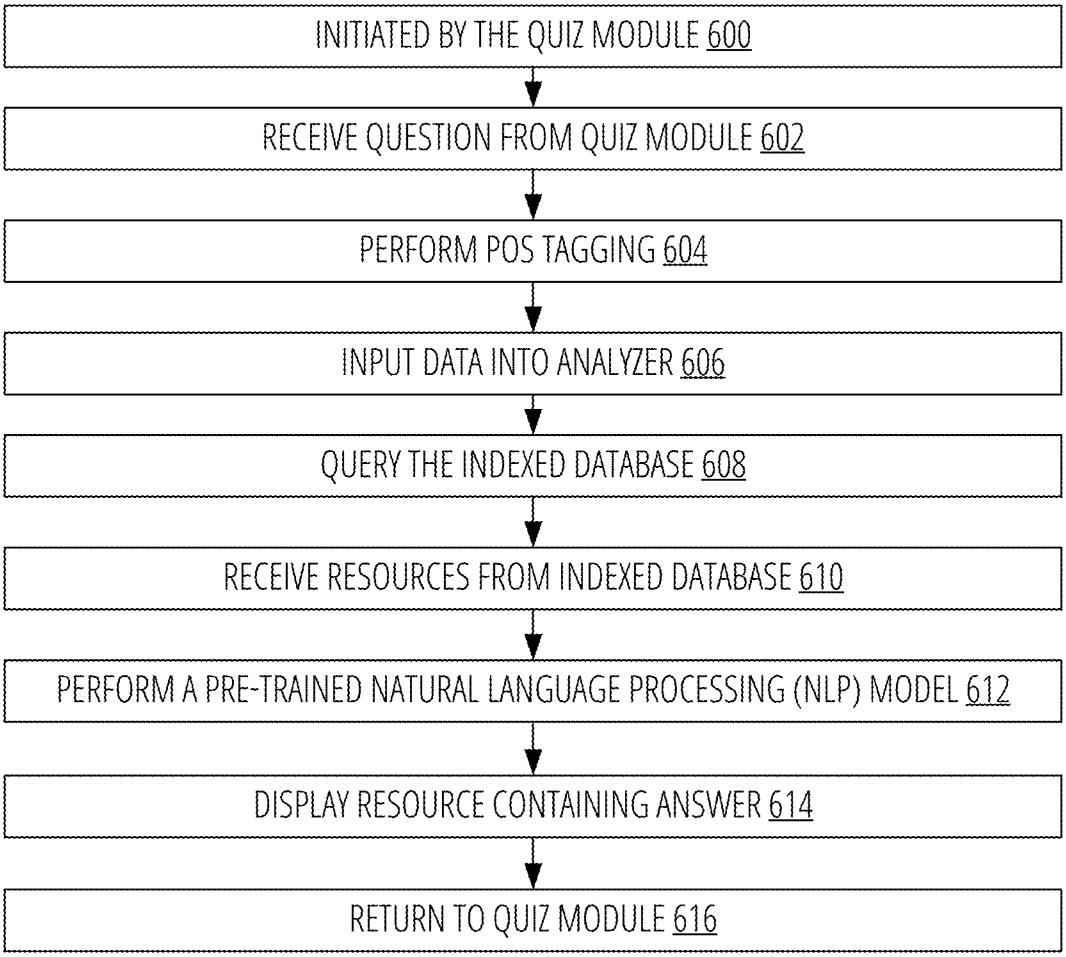
FIG. 6 illustrates a recommendation module.

FIG. 6 illustrates the recommendation module 122. The process may begin with the recommendation module 122 being initiated, at step 600, by the quiz module 120. In some cases, the recommendation module 122 may be continuously polling to receive the question from the quiz module 120, and the process may begin once the question is received. The recommendation module 122 may receive, at step 602, the question from the quiz module 120. For example, the recommendation module 122 may receive the question that the student incorrectly answered during the quiz module 120. The recommendation module 122 performs, at step 604 part of speech (POS) POS tagging on the received question. For example, the recommendation module 122 may tag the text of the question with POS tags such as an adjective, adverb, conjunction, determiner, article, noun, numeral, particle, pronoun, verb, punctuation marks, etc. Then, the weights may be used to boost each POS tag to accurately boost the key terms in the question and lower the importance of non-keywords. In some cases, the POS tag boosting may be used as a technique used in natural language processing (NLP) and information retrieval (IR) to improve the accuracy of search results by giving higher weights or scores to certain parts of speech in the query or indexed documents.

The recommendation module 122 may input, at step 606, the data into the analyzer. For example, the recommendation module 122 may input the POS tag boosting data into the analyzer. For example, the text is first analyzed using the analyzer specified for the index. The analyzer breaks down the text into individual terms or tokens, applies configured filters, and generates a list of terms to search for. Once the text has been analyzed, the query is parsed to determine the search parameters, such as the search terms, the fields to search in, and any filters or aggregations to apply.

The recommendation module 122 may query, at step 608, the indexed database 130. For example, the analyzer may perform the query, such as the search against the indexed data, using the inverted index data structure to locate documents that match the search terms and parameters. The search results are returned as a set of hits, which represent the documents that match the query. In some cases, the search results may be ranked based on a relevance score, which may be calculated using a variety of factors, such as the frequency and proximity of the search terms in the document and any configured boost factors or relevance algorithms.

The recommendation module 122 may receive, at step 610, the resources from the indexed database 130. For example, the recommendation module 122 may receive the search results as a set of hits representing the documents that match the query. In some cases, the search results may be ranked based on a relevance score, which may be calculated using a variety of factors, such as the frequency and proximity of the search terms in the document and any configured boost factors or relevance algorithms. The recommendation module 122 may perform, at step 612, a pre-trained natural language processing (NLP) model, such as Bidirectional Encoder Representations from Transformers (BERT), on the received resources from the indexed database 130. For example, the recommendation module 122 treats each potential page as context, and the context and original question are inputted into a pre-trained BERT model, which returns the localized answer to the question.

In some cases, the pre-trained NLP model may be based on a transformer architecture and may be designed to generate contextualized word embeddings, such as word vectors that capture meaning within a sentence's context or a larger text. The pre-trained NLP model may be a bidirectional model that captures more complex relationships between words and produces more accurate contextualized embeddings. The recommendation module 122 may display, at step 614, the resource containing the answer to the received question. For example, the recommendation module 122 may display the answer to the question in the resource to the student, which provides the student with real-time feedback for the question that was answered incorrectly. The recommendation module 122 may return, at step 616, to the quiz module 120.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
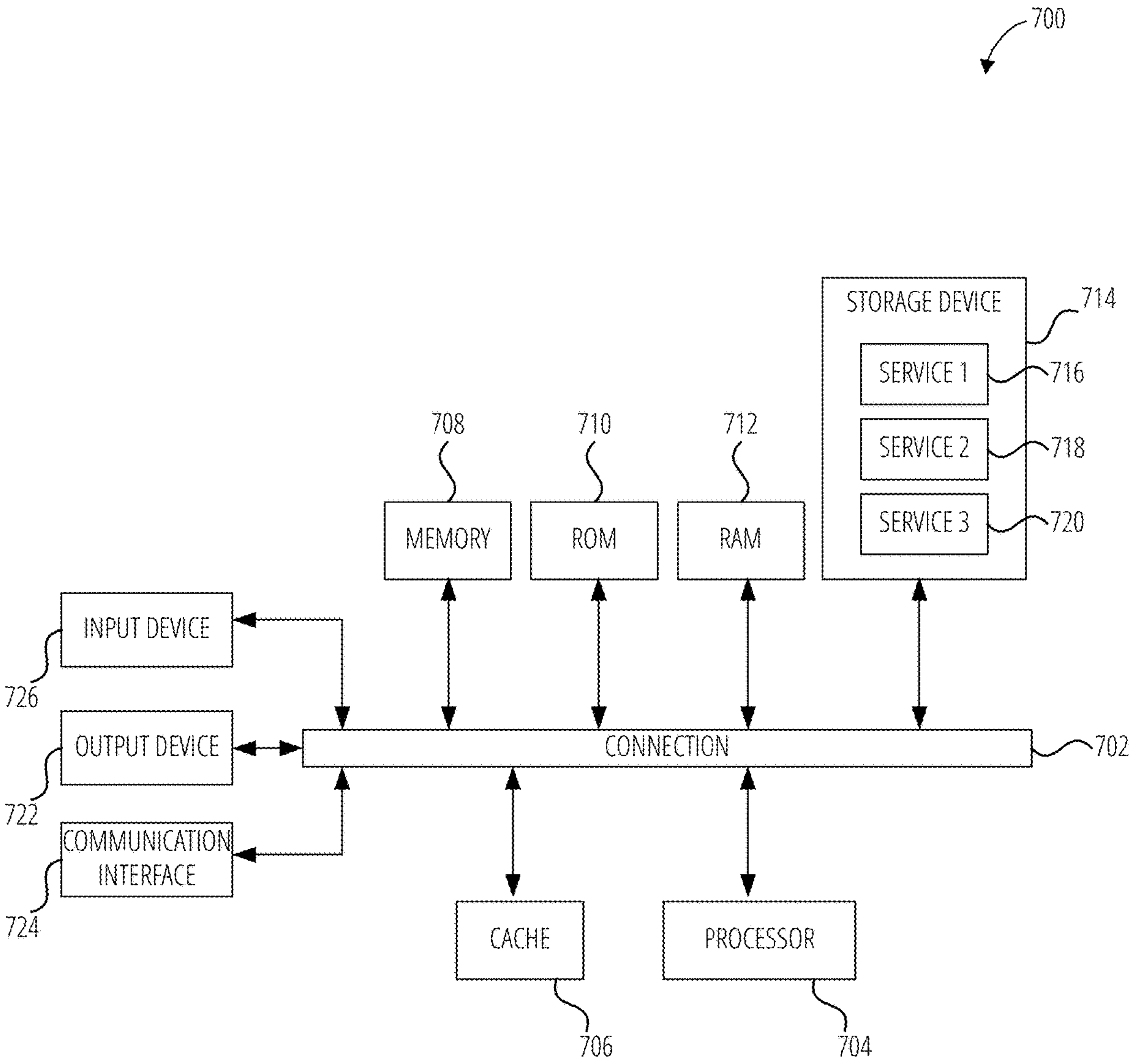
FIG. 7 illustrates an example of computing system.

FIG. 7 shows an example of computing system 700, which can be for example any computing device making up education network 102, or any component thereof in which the components of the system are in communication with each other using connection 702. Connection 702 can be a physical connection via a bus, or a direct connection into processor 704, such as in a chipset architecture. Connection 702 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 700 includes at least one processing unit (CPU or processor) 704 and connection 702 that couples various system components including system memory 708, such as read-only memory (ROM) 710 and random access memory (RAM) 712 to processor 704. Computing system 700 can include a cache of high-speed memory 708 connected directly with, in close proximity to, or integrated as part of processor 704.

Processor 704 can include any general purpose processor and a hardware service or software service, such as services 716, 718, and 720 stored in storage device 714, configured to control processor 704 as well as a special-purpose processor where software instructions are incorporated into the actual processor design. Processor 704 may essentially be a completely self-contained computing system, containing multiple cores or processors, a bus, memory controller, cache, etc. A multi-core processor may be symmetric or asymmetric.

To enable user interaction, computing system 700 includes an input device 726, which can represent any number of input mechanisms, such as a microphone for speech, a touch-sensitive screen for gesture or graphical input, keyboard, mouse, motion input, speech, etc. Computing system 700 can also include output device 722, which can be one or more of a number of output mechanisms known to those of skill in the art. In some instances, multimodal systems can enable a user to provide multiple types of input/output to communicate with computing system 700. Computing system 700 can include communication interface 724, which can generally govern and manage the user input and system output. There is no restriction on operating on any particular hardware arrangement, and therefore the basic features here may easily be substituted for improved hardware or firmware arrangements as they are developed.

Storage device 714 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 714 can include software services, servers, services, etc., that when the code that defines such software is executed by the processor 704, it causes the system to perform a function. In some embodiments, a hardware service that performs a particular function can include the software component stored in a computer-readable medium in connection with the hardware components, such as processor 704, connection 702, output device 722, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Figure 8:
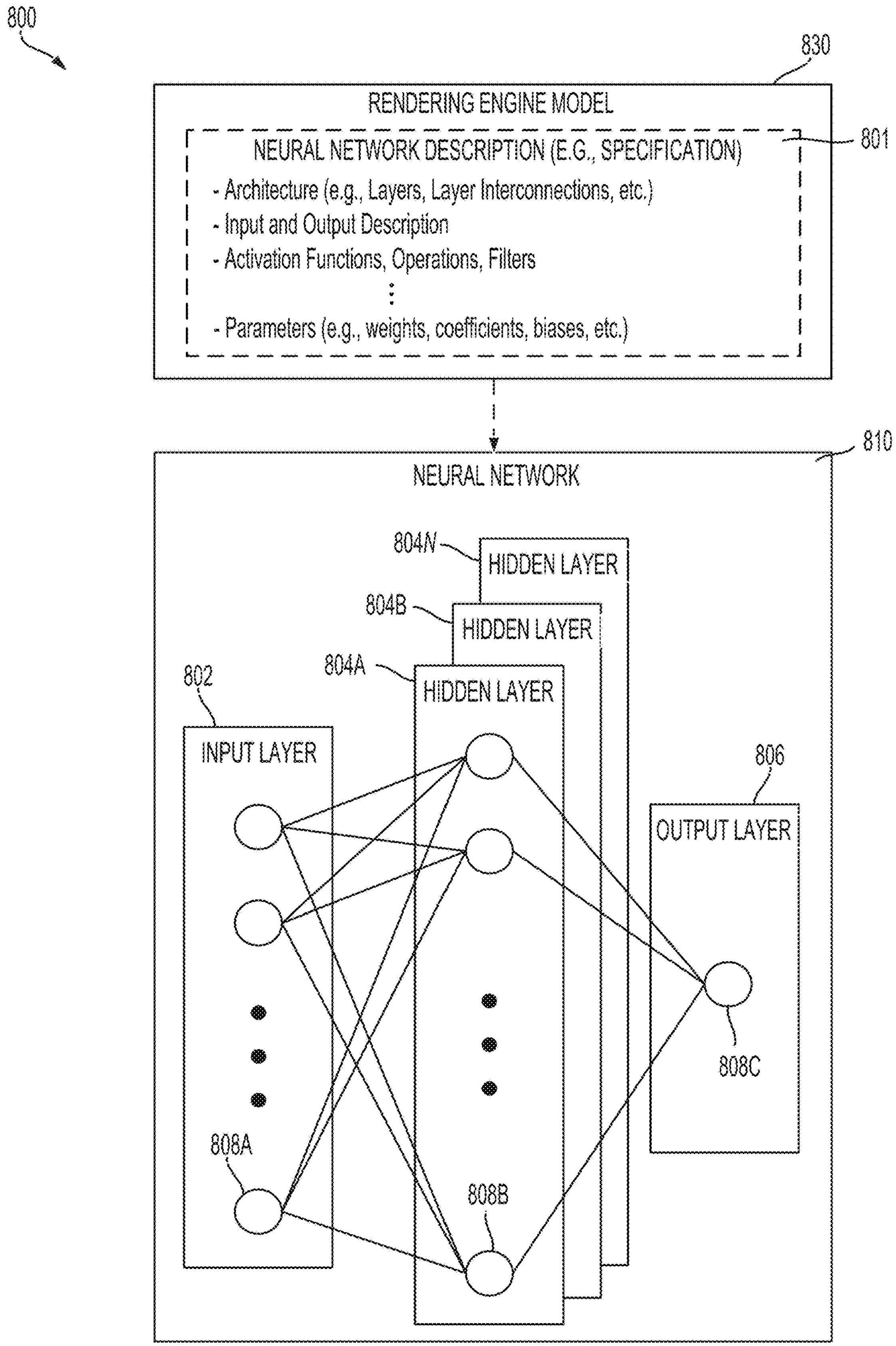
FIG. 8 illustrates an example neural network architecture.

FIG. 8 illustrates an example neural network architecture. Architecture 800 includes a neural network 810 defined by an example neural network description 801 in rendering engine model (neural controller) 830. The neural network 810 can represent a neural network implementation of a rendering engine for rendering media data. The neural network description 801 can include a full specification of the neural network 810, including the neural network architecture 800. For example, the neural network description 801 can include a description or specification of the architecture 800 of the neural network 810 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc. and so forth.

The neural network 810 reflects the architecture 800 defined in the neural network description 801. In this example, the neural network 810 includes an input layer 802, which includes input data, such as features of the questions. In one illustrative example, the input layer 802 can include data representing a portion of the input media data such as a patch of data or pixels (e.g., features of the questions).

The neural network 810 includes hidden layers 804A through 804 N (collectively "804" hereinafter). The hidden layers 804 can include n number of hidden layers, where n is an integer greater than or equal to one. The number of hidden layers can include as many layers as needed for a desired processing outcome and/or rendering intent. The neural network 810 further includes an output layer 806 that provides an output (e.g., question difficulty) resulting from the processing performed by the hidden layers 804. In one illustrative example, the output layer 806 can predict question difficulty.

The neural network 810 in this example is a multi-layer neural network of interconnected nodes. Each node can represent a piece of information. Information associated with the nodes is shared among the different layers and each layer retains information as information is processed. In some cases, the neural network 810 can include a feed-forward neural network, in which case there are no feedback connections where outputs of the neural network are fed back into itself. In other cases, the neural network 810 can include a recurrent neural network, which can have loops that allow information to be carried across nodes while reading in input.

Information can be exchanged between nodes through node-to-node interconnections between the various layers. Nodes of the input layer 802 can activate a set of nodes in the first hidden layer 804A. For example, as shown, each of the input nodes of the input layer 802 is connected to each of the nodes of the first hidden layer 804A. The nodes of the hidden layer 804A can transform the information of each input node by applying activation functions to the information. The information derived from the transformation can then be passed to and can activate the nodes of the next hidden layer (e.g., 804B), which can perform their own designated functions. Example functions include convolutional, up-sampling, data transformation, pooling, and/or any other suitable functions. The output of the hidden layer (e.g., 804B) can then activate nodes of the next hidden layer (e.g., 804 N), and so on. The output of the last hidden layer can activate one or more nodes of the output layer 806, at which point an output is provided. In some cases, while nodes (e.g., nodes 808A, 808B, 808C) in the neural network 810 are shown as having multiple output lines, a node has a single output and all lines shown as being output from a node represent the same output value.

In some cases, each node or interconnection between nodes can have a weight that is a set of parameters derived from training the neural network 810. For example, an interconnection between nodes can represent a piece of information learned about the interconnected nodes. The interconnection can have a numeric weight that can be tuned (e.g., based on a training dataset), allowing the neural network 810 to be adaptive to inputs and able to learn as more data is processed.

The neural network 810 can be pre-trained to process the features from the data in the input layer 802 using the different hidden layers 804 in order to provide the output through the output layer 806. In an example in which the neural network 810 is used to predict question difficulty, the neural network 810 can be trained using training data that includes historical course features of the questions and historical difficulty of questions. For instance, features of the questions can be input into the neural network 810, which can be processed by the neural network 810 to generate outputs which can be used to tune one or more aspects of the neural network 810, such as weights, biases, etc.

In some cases, the neural network 810 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for the neural network 810, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, the neural network 810 is unable to determine low level features and thus cannot make an accurate determination of what the classification of the object might be. A loss function can be used to analyze errors in the output. Any suitable loss function definition can be used.

The loss (or error) can be high for the first training dataset (e.g., features of the questions) since the actual values will be different than the predicted output. The goal of training is to minimize the amount of loss so that the predicted output comports with a target or ideal output. The neural network 810 can perform a backward pass by determining which inputs (weights) most contributed to the loss of the neural network 810, and can adjust the weights so that the loss decreases and is eventually minimized.

A derivative of the loss with respect to the weights can be computed to determine the weights that contributed most to the loss of the neural network 810. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 810 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 810 can represent any other neural or deep learning network, such as an autoencoder, a deep belief nets (DBNs), a recurrent neural networks (RNNs), etc.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method for machine learning driven adaptive testing, the method comprising:

receiving online testing data associated with an online course from a teacher device, wherein the online testing data includes a plurality of questions and one or more correct answers corresponding to the plurality of questions;

providing the received online testing data to a difficulty scoring machine-learning model, wherein the difficulty scoring machine-learning model incorporates a knowledge graph that includes graph-structured data correlating words of questions to an associated difficulty level derived from historical probability-weighted online testing data;

analyzing the plurality of questions using the difficulty scoring machine-learning model to predict a difficulty level of the plurality of questions in the online testing data for students of the online course, wherein the prediction is based at least in part on a difficulty level corresponding to words of the plurality of questions as derived from the knowledge graph and historical probability-weighted online testing data including previously analyzed questions having one or more same words as the plurality of questions in the received online testing data;

training the difficulty scoring machine-learning model by updating the historical probability-weighted online testing data for the graph-structured data correlating words of questions to the associated difficulty level relative a percentage of correct respective answers from students associated with the online course to the predicted difficulty level; and automatically generating a future test including at least a subset of the plurality of questions, wherein the future test is responsive to a requested difficulty level corresponding to a new group of students associated with the online course and adaptively selected given a current difficulty level of previously analyzed historical probability-weighted online testing data.

2. The method of claim 1, further comprising:

assigning a similarity level between vectors associated with one or more responsive answers received from the students associated with the online course and vectors associated with a correct responsive answer and incorporated into the historical probability-weighted online testing data;

identifying that a received responsive answer is incorrect based on the similarity level for a corresponding question from the subset of the plurality of questions;

querying an indexed database that stores text associated with the online course and in response to incorrect answers based at least in part on the one or more responsive answers to the corresponding question from the subset of the plurality of questions; and presenting the text based on a result from the queried indexed database.

3. The method of claim 2, further comprising:

extracting a plurality of chunks from text associated with the online course, wherein each of the chunks is extracted based on syntactic correlation;

identifying one or more of the chunks that includes context for a correct answer to the question; and combining the extracted chunks into the presented text.

4. The method of claim 3, further comprising:

breaking one of the plurality of chunks into a plurality of tokens;

applying one or more configured filters to the plurality of tokens;

generating a list of terms corresponding to the plurality of filtered tokens, wherein the terms in the list of terms are mapped to a respective chunk of the plurality of chunks; and storing the list of terms in the indexed database.

5. The method of claim 1, further comprising identifying a similarity level between question features of the plurality of questions and a historical question based on one or more rules weighted by the difficulty scoring machine-learning model.

6. The method of claim 1, wherein the online testing data further including a previously known difficulty for one or more of the plurality of questions analyzed by the difficulty scoring machine-learning model, and wherein the prediction is further based on the previously known difficulty analyzed in conjunction with the knowledge graph and historical probability-weighted online testing data including the previously analyzed questions.

7. The method of claim 1, further comprising generating one or more customized learning activities based on the percentage of correct respective answers for the students providing answers to the plurality of questions associated with the online course.

8. A non-transitory computer-readable storage medium comprising instructions executable by a processor to perform a method for machine learning driven adaptive testing, the method comprising:

receiving online testing data associated with an online course sent over a communication network from a teacher device, wherein the online testing data includes a plurality of questions and one or more correct answers corresponding to the plurality of questions;

providing the received online testing data to a difficulty scoring machine-learning model, wherein the difficulty scoring machine-learning model incorporates a knowledge graph that includes graph-structured data correlating words of questions to an associated difficulty level derived from historical probability-weighted online testing data;

analyzing the plurality of questions using the difficulty scoring machine-learning model to predict a difficulty level of the plurality of questions in the online testing data for students of the online course, wherein the prediction is based at least in part on a difficulty level corresponding to words of the plurality of questions as derived from the knowledge graph and historical probability-weighted online testing data including previously analyzed questions having one or more same words as the plurality of questions in the received online testing data;

training the difficulty scoring machine-learning model by updating the historical probability-weighted online testing data for the graph-structured data correlating words of questions to the associated difficulty level relative a percentage of correct respective answers from students associated with the online course to the predicted difficulty level; and automatically generating a future test including at least a subset of the plurality of questions, wherein the future test is responsive to a requested difficulty level corresponding to a new group of students associated with the online course and adaptively selected given a current difficulty level of previously analyzed historical probability-weighted online testing data.

* * * * *